Oct. 2, 1951     E. MERCIER ET AL     2,569,640

OSCILLATING FLUID PRESSURE MACHINE

Filed April 28, 1945     3 Sheets-Sheet 1

Ernest Mercier and Marcel Ehlinger
INVENTORS
By George N. Corey
Their Attorney

Oct. 2, 1951   E. MERCIER ET AL   2,569,640
OSCILLATING FLUID PRESSURE MACHINE
Filed April 28, 1945   3 Sheets-Sheet 3

INVENTORS
Ernest Mercier
BY Marc Ehlinger

ATTORNEY

Patented Oct. 2, 1951

2,569,640

UNITED STATES PATENT OFFICE 2,569,640

OSCILLATING FLUID PRESSURE MACHINE

Ernest Mercier and Marcel Ehlinger, Paris, France, assignors, by mesne assignments, to Moore, Inc., Atlanta, Ga., a corporation of Georgia Application April 28, 1945, Serial No. 590,920
In France February 16, 1943

Section 1, Public Law 690, August 8, 1946
Patent expires February 16, 1963

21 Claims. (Cl. 230—159)

This invention relates to fluid pressure machines and more especially to those in which the elements thereof which are acted upon by the fluid pressure medium or which act upon such a fluid medium concomitantly with a change in the pressure thereof are oscillatable about an axis.

Machines are known, in particular the socalled "free piston" machines, which use the inertia of masses impelled with linear reciprocating movements for transmitting mechanical energy without resorting to any kinematic transmission means of the rod-and-crank type. In the said machines, in the first portion of each power stroke, the action of the driving medium is used principally for accelerating the movable masses by imparting an increasing speed thereto and consequently accumulating an increasing inertia in the said masses. During the second portion of the same power stroke the movable masses give back the acquired inertia while losing their speed progressively and in this way perform useful work. Such useful work T generally consists in the compression of a definite gas mass. It finds its expression in the formula:

$$T = \frac{1}{2} M V_m^2$$

M being the value of the movable mass and $V_m$ its maximum speed.

This invention has for one of its principal objects to provide a new class of machine which comprises as many varieties as the free-piston machine class. More particularly, the invention may be embodied in machines of the compressor or the generator type as desired, the motive units being combustion-, steam- or gas-units indifferently.

In this new class of machine, as in the free-piston machines, the kinetic energy of moving masses is used to produce useful work without the intervention of any kinematic transmission mechanism. Instead, however, of using the inertia of masses impelled with a straight translation movement, the kinetic energy called upon is that of masses impelled with a rotary motion about an axis. In the first portion of each motive stroke the movable masses are given a continuously accelerated rotary motion and will accumulate kinetic energy $I\omega^2$, $I$ being the moment of inertia of the masses and $\omega$ their angular speed at a definite time. At the end of the said first stroke portion the acceleration ceases and $\omega$ passes through a maximum $\omega_m$. In the second portion of the same stroke the moving masses will convert the kinetic energy therein into work while decelerating, and the value of the work T developed during the interval in which the masses are returning to rest is $$T = \frac{1}{2} I \omega_m^2$$

The drawing appended hereto shows by way of example how this invention can be realized.

Figure 1:
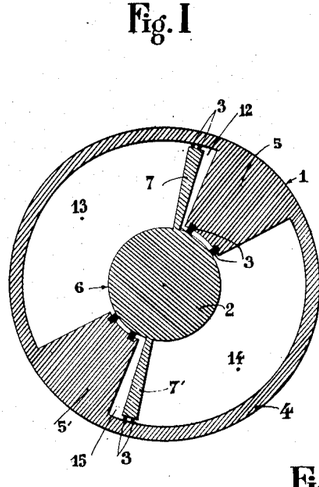
Fig. 1 shows a somewhat diagrammatic view in cross section of a machine embodying the invention taken at right angles to the axis of oscillation.
Figure 2:
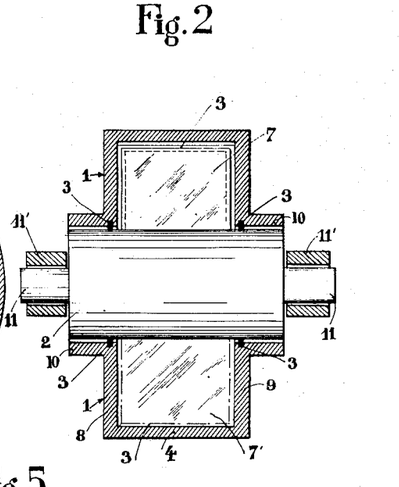
Fig. 2 is a somewhat diagrammatic view taken as a vertical longitudinal section on the axis of Fig. 1.

The apparatus comprises essentially two separate elements denoted by different hatching:

1 is the outer element or the casing and comprises an outer cylindrical wall 4, two side plates or covers 8, 9 formed with a central hub 10 and a pair of bracing partitions 5, 5'.

6 designates the inner element or the wheel. It comprises a cylindrical drum 2 carried by a shaft 11 rotatably mounted in bearings 11'. The drum 2 carries a pair of vanes 7, 7'. The casing 1 is formed to conform generally to the meridian edge of the vanes 7, 7'.

Packing members 3 are arranged in such manner that as the drum rotates about its axis and the vanes 7 move within the casing the gaseous or like fluids that may be present in the apparatus cannot leak from one side of said vanes to the other or escape from the apparatus between the drum surface and the walls of hubs 10.

The machine is provided with cut-off means (not shown) which may be of any suitable poppet-, slide- or like valve type.

In the apparatus with the parts in the position shown in Fig. 1, the upper vane 7 divides the upper chamber of the casing into two portions denoted by 12 and 13; likewise, the lower vane 7' divides the lower chamber into two portions 14 and 15, which, if desired, may be of volume unequal to portions 12 and 13 respectively. Let it be assumed that a motive fluid under pressure is taken in at 12 or that a combustion takes place in 12 which contains a combustible fluid and precompressed air while 13 is connected with the open air for discharge thereto of the exhaust gases of the previous stroke contained in 13. Let it also be assumed that 14 contains a gas, e. g., air at atmospheric pressure, and that by suitable valve gear 15 previously has been set into communication with the delivery pipe for said gas or air after its compression to the desired pressure in 15. By the conjugated action of the motive fluid in 12 and of the air under compression in 15 (15 here being comparable to a clearance), the vanes 7, 7' will drive the drum 2 which will begin to rotate or pivot about its axis without at first encountering any substantial resistance from the air in 14. The apparatus will then be exactly in the same condition as a free-piston apparatus at starting, except that its movable masses, instead of moving on a straight line, will take a circular motion about the axis of shaft 11. At approximately half-travel the increasing pressure of the air in 14 will balance the pressure of the gases expanded in 12, and the angular speed $\omega$ will reach its maximum value $\omega m$. During the second portion of the travel the angular speed will decrease gradually because before the end of the stroke the gas exhaust from chamber 13 will be closed in order to provide for the compression of said gases to bring them to the initial pressure such as prevailed in 12 at the beginning of the movement. During this portion of the stroke the air compressed in 14 will be forced into the delivery pipe while fresh air will be sucked into 15. At length, the angular speed becomes zero before the vane 7 comes into contact with the adjacent bracing partition 5'.

At that time all the conditions will be such as to allow the same operations to take place again in the reverse direction, the intake of the motive fluid under pressure into chamber 13 taking place or the combustion occurring in chamber 13 and the exhaust of the gases occurring in 12 while on the compressor side the suction takes place in 14 and the compression in 15.

A rotary free-oscillation machine is thus provided having a motive or power impulse in each stroke, in which the forces on either element 1 and 6 of the machine are at all times strictly equal, since the same gas masses will always act upon homologous elements having the same geometrical dimensions in either part of the machine. The frequency of the strokes in such a machine will be comparable in every respect to that of a conventional free-piston machine having similarly sized elements.

The output of such a machine in a given time unit can be controlled by varying the cut-off of the fluid pressure medium supplied to the machine to develop the power, as in 12 and 13. The balance between the motive power supplied and the power utilized can be controlled automatically by the action of the throttle on the amount of fluid medium taken in. The throttle may be actuated under the control, e. g., of the variations in the amplitude of the movement.

It will be noted that in the preceding discussion no reference has been made to the state of motion or rest of the casing 1. Within the scope of the invention the machine can be constructed so that the casing 1 is firmly secured and stationary or it may be allowed to swivel under the expansive force of the fluid under pressure in the chambers 12 and 13, in which event the drum 2 will act as a bearing for the same.

Inasmuch as the element 1 will always be subjected to alternating forces capable of reaching a high value, it is necessary when said casing 1 is intended to be fixed, that particular precautions against movement should be taken in its installation, as is usual, e. g., in the installation of high-power combustion engines of the conventional type.

Where the casing 1 is not fixed it will take a rotational movement in the direction opposite to that of the element 6. Taking I' and $\omega'$ as the moment of inertia and the angular speed of element 1 respectively, just the same as I and $\omega$ were taken as the corresponding values for elements 6, the relation obtains at all times:

$$\frac{\omega'}{\omega}=\frac{I}{I'}$$

The angles swept through by either moving body in each stroke will thus be inversely proportional to the inertia of said moving bodies.

It is convenient to measure the angles swept through as distances reckoned on the circumference described by the centre of gravity of the vane surface exposed to the fluid pressure, and to take as the stroke the total distance travelled at said circumference during a cycle. It will be realized that in a machine of which the total stroke is .25 m., for instance, the moment of inertia of its casing being assumed to be 10 times that of the inner movable body, the travel of the casing at the circumference considered would be .0227 m. and that of the inner element .227 m. in the reverse direction at every stroke.

While Fig. 1 shows only an elementary embodiment within the scope of the invention the invention may be embodied in machines of extremely different types. For example, machines may be constructed having a stationary casing which is free of every rotational force and having within the casing a pair of elements adapted to pivot in opposed relation to each other.

Figure 3:
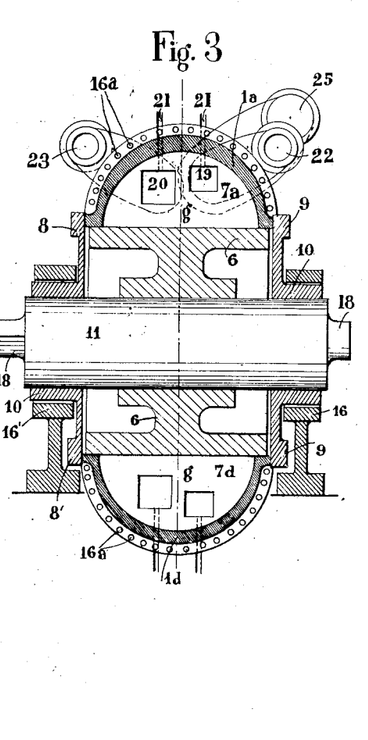
Fig. 3 is a longitudinal section on the axis of oscillation and Fig. 4 is a section transverse to said axis of another embodiment of the invention.

By way of further disclosure and without limiting the invention to the specific embodiment disclosed, description will be given in connection with Figs. 3 and 4 of a machine designed according to this invention and intended for the production of high-pressure air. This machine is fitted with driving elements adapted to receive high-pressure steam or hot gases. The driving elements comprise one high-pressure unit and two low-pressure units. The machine is also fitted with compressor elements which likewise comprise two low-pressure units and one high-pressure unit.

Figure 4:
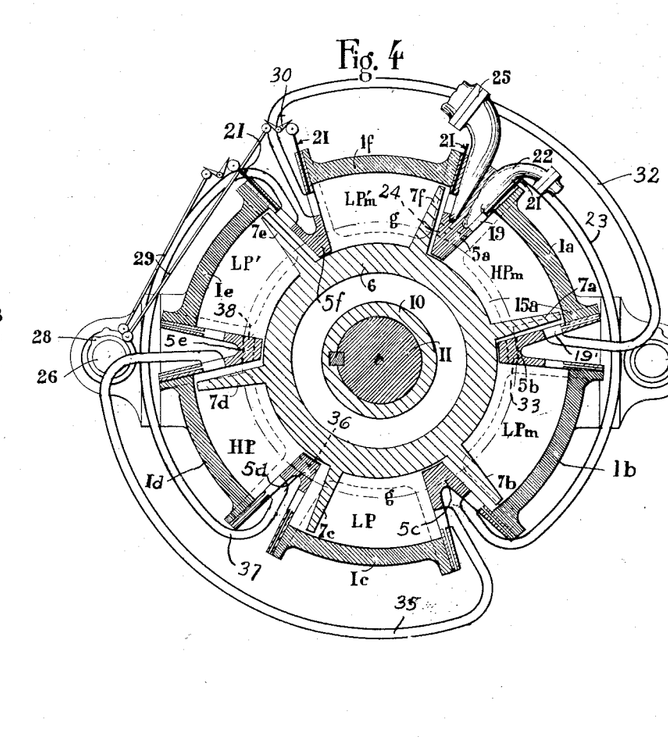

As shown in Fig. 4, the casing comprises six circumferentially disposed sections indicated at 1a, 1b, 1c, 1d, 1e, 1f. It is not necessary that these sections should have the same circumferential length or the same length of the arc on which the travel is reckoned as described. Their individual lengths conform not only to the stroke, which of course is the same for all the sections when measured at the same radius, but also allow for the thickness of the movable vanes and the clearances necessary between the vanes in their extreme positions and the walls which form the ends of the chambers within which they oscillate. These clearances and wall thicknesses may differ from one section to another. Moreover, the radii of the sections may vary from one section to another. The wall thickness and metal quality in each section may be adapted to the gas pressures and temperatures prevailing therein. The six sections considered are interconnected by six bracing blocks in the form of sectors indicated at 5a, 5b, 5c, 5d, 5e, 5f. The sections and bracing blocks are assembled by bolts denoted at 16a in the longitudinal section shown in Fig. 3. For that purpose each section is provided with flanges indicated at 15a for section 1a. The bracing block sectors may be formed with inclined intersecting walls defining a V-shaped space which provides access to ports leading to the chambers as hereinafter described. The thicknesses and metal for both the bracing blocks and the sections are chosen with a view to providing for the necessary mechanical strength of the whole. The casing structure may be completed by the side or end covers 8 and 9 formed with cylindrical end bearings 10 supported in pedestal bearings 16, 16'.

The sections and the sectors provide a structure in which each of these elements of the casing can expand and contract, as required by the temperature of the fluid media within the respective chambers, without involving undue stresses on the other elements of the casing associated therewith.

The inner element or wheel comprises the central cylindrical member 6 of a form to provide low weight depending on the frequency of oscillation to be obtained. The cylindrical member 6 is provided along its outer periphery with six vanes. In the particular embodiment shown in Figs. 3 and 4 these vanes are formed in one piece with the cylinder 6 as shown at 7a, 7b, 7c, 7d, 7e, 7f. The cylinder 6 is keyed on the central shaft 11 which pivots in the bearings 10 provided for the same in the side covers 8 and 9. The bearings 10 in turn are rotatably supported in stationary pedestal bearings 16, 16' which provide the fixed frame of the device. The sections 1a, 1b, 1c, 1d, 1e, 1f are formed as shown in Fig. 3 to conform to the meridian edge of the vanes with which they respectively are associated.

This arrangement makes it possible for both the casing and the cylinder 6 to oscillate. The casing however, as described above, provided certain precautions are taken, may be fixed. The shaft 11 is formed at the end thereof with a reduced portion 18 adapted to carry gear wheels or other devices which actuate the valves as will be described in the following.

The section 1a forms with the bracing blocks 5a and 5b a chamber $HP_m$ which receives the live steam or another gas at its full pressure. After the steam or gas has done its work in this chamber it flows simultaneously through conduits 23, 24 or 32, 33 into the chambers which are formed by sections 1b and 1f at either side of section 1a. These sections are indicated by reference indicia $LP_m$ and $LP'_m$.

Air under the normal pressure or previously compressed to a predetermined pressure may be introduced into the chambers formed by sections 1c and 1e simultaneously. These chambers are indicated at LP and LP'. After its compression in the said sections the air is forced through conduits 35, 36, 37, 38 into the chamber formed by section 1d, indicated at HP, where it is brought up to the end pressure and forced into the delivery pipe, not shown, through ports about to be described.

Ports are machined or otherwise formed in the faces of the bracing blocks which form the end walls of the respective chambers as indicated at 19, 19', Fig. 4 and 19, 20, Fig. 3 for the section 1a. In addition, said blocks carry the cut-off members or valves which for clarity are diagrammatically shown at 21 only for blocks 5a and 5f.

As shown in the drawing, the cut-off members or valves used may be of the sliding type, for instance a grid-valve of the type providing the subject-matter of our copending application, Serial No. 600,390, filed June 19, 1945, in the United States Patent Office, for "Obturator and Control Device." Poppet valves, piston-valves, etc., may be used if desired.

The bracing blocks receive the ends of all the pipes by which gas or steam is led in or out of the several chambers as well as those of all the pipes interconnecting the sections. For block 5a the steam or gas intake is indicated at 22, the exhaust for the partly expanded medium being led towards $LP_m$ through pipe 23, the exhaust of the same medium being led towards $LP'_m$ through passage 24, Fig. 4, which advantageously may be provided within the bracing block 5a itself between the exhaust port from $HP_m$ and the intake port to $LP'_m$ controlled by a valve similar to valve 21 but omitted for the sake of clarity in the drawing. Similarly, the block 5b the steam introduced into chamber $HP_m$ through this block may be exhausted to the chamber $LP'_m$ through pipe 32 and to the chamber $LP_m$ through passage 33 in block 5b. Finally the fully expanded motive power medium may be led from $LP'_m$ at 25 and from $LP_m$ by a similar connection not shown. Thus, each bracing block is fitted with four cut-off controls or valve gears and four pipe connections, which may be limited to three in blocks 5a, 5b, 5d and 5e, as explained, where the partly expanded or the partly compressed medium is to be transferred through a passage in the block itself to the adjacent chamber.

The conduit connections between the ports formed in the block 5d and the chambers provided by the sections 1c and 1e on the one hand and section 1d on the other are similarly arranged, as shown in Fig. 4, to those described in connection with the block 5a. From a consideration of these connecting conduits it will be understood, when the sections providing the chambers LP and LP' are used as the first stage chambers for air compression, the air introduced into these chambers through ports in the sector blocks 5f, 5e, 5d and 5c may be compressed first in the chambers LP and LP'. With respect to the chamber LP, the air compressed therein by vane 7c in the forward stroke, counterclockwise in Fig. 4, is led through the pipe 35 to the inlet port in the block 5e to the chamber HP for compression in this high pressure chamber HP upon the return stroke, clockwise in Fig. 4. Similarly, on the return stroke of the vane 7c, the air compressed in the chamber LP is delivered through the passage 36 in block 5d into the chamber HP for compression therein on the next forward stroke. Connection also is established through the conduit 37 to the chamber HP for compression therein during a forward stroke of the air which is first compressed in the low pressure chamber LP' in the return stroke of vane 7e. The air compressed initially in the chamber LP' during a forward stroke of vane 7e is delivered through the passage 38 into the chamber HP for compression therein during the next return stroke of vane 7D.

The valve-gear is controlled by a pair of auxiliary timing shafts 26, 27 symmetrically arranged parallel to the main shaft 11, as shown in Fig. 4. Although said timing shafts 26, 27 are driven by the main shaft which describes a reciprocating oscillatory movement of limited amplitude, they may be impelled with a wholly rotary motion by conventional means, not shown, and at the rate of one revolution for the two strokes, forward and return, of the main shaft. Such a combination of movements, however, may be obtained, for example, by the apparatus described in Patent No. 2,493,355 issued January 3, 1950, on the applicants' United States application Serial No. 596,499, filed May 29, 1945, corresponding in part to the French application filed December 9, 1942, for "Improvements in or relating to free-piston machines." The auxiliary shafts 26, 27 may actuate the cut-off members by means of cams 28, rods 29 and rocking levers 30. As described, each bracing block is fitted with four sets of cams, rods and rocking levers, which amounts to 24 in all, that is, 12 for each auxiliary shaft 26, 27. Where, as above described in connection with Fig. 4, the fluid to be expanded or compressed is conveyed from or toward a given chamber to or from two other chambers, the flow of the fluid pressure medium in these two paths may be controlled by one of the cut off members of the valve gear controlling a single port by suitably connecting the conduits or passageways together. On the other hand, separate ports in the wall of the bracing block may be provided to which the separate conduits or passageways are connected, an additional set of cams, rods and rocking levers being provided for control of the additional valve for this additional port.

The operation of the device of Figs. 3 and 4 in general is the same as described in connection with Figs. 1 and 2. In accordance with the above description of the conduit and passage connections between the chambers and of the valve gear provided for control of the openings in the bracing blocks or sectors, by way of example, the flow of the fluid being compressed may be traced in the following manner. Such fluid may be drawn into the low pressure compression chambers LP and LP' respectively through the ports in the blocks 5c and 5e controlled by valves not shown during the movement of the cylinder 6 in the clockwise direction in Fig. 4 to fill these chambers when the vanes 7c and 7e reach the position shown in Fig. 4. At the proper time under control of the valve gear the valves controlling the inlet ports just referred to in the blocks 5c and 5e will be closed to prevent discharge therethrough of the fluid from these chambers during the succeeding stroke of the vanes 7c and 7e for compressing the fluid drawn into the chambers LP and LP' as the vanes 7c and 7e move from the positions shown in Fig. 4 upon counterclockwise movement of the cylinder 6. The valve gear will control the valve for the passage in the block 5c leading to the conduit 35 and also will control the valve for the passage 38 in the block 5e to close these passages to prevent discharge therethrough during this compression stroke. Thus the pressure, for example atmospheric pressure, of the fluid as it is drawn into the chambers LP, LP' is increased simultaneously in these two chambers.

At the proper moment the valve controlling the passage leading to the conduits 35 and controlling the passage 38 will be opened and the fluid at increased pressure will be delivered through these passages to the chamber HP at the same side of the vane 7d, this vane now having moved from the position shown in Fig. 4 to a position adjacent the block 5d. Thereupon, the valve controlling the passages in the block 5e, that is the passage 38, and that to which the conduit 35 is connected will be closed. The valve not shown in the block 5d which controls discharge of the fluid from the chamber HP also will be closed and the valve controlling the port to which the conduit 37 is connected will be opened. The valve controlling the passage 36 in the block 5d also will be opened. Upon the next movement, therefore, of the cylinder 6 in the clockwise direction the fluid in the high pressure chamber HP will be compressed by the vane 7d in its movement toward the block 5e. At the same time the fluid under low compression will be discharged from the low pressure chambers LP and LP' respectively through the passage 36 and the conduit 37 into the high pressure chamber HP between the block 5d and the vane 7d. When the compression of the fluid between the vane 7d and the block 5e has proceeded until the desired high pressure is reached, the discharge valve, not shown, in the block 5e will open and the high pressure compressed fluid will be discharged therethrough from the machine. This action is repeated in succeeding strokes.

By an arrangement of similar character but modified in its details, instead of a steam or gas driving unit it is possible to provide a driving unit comprising one or more sections and the cooperating sectors operating as internal combustion elements which most conveniently may be of the four cycle double-acting type in each such driving unit.

The whole structure may be covered with the conventional lagging and provided with means for a circulating cooling medium. The embodiment of these features will be attended by no particular difficulty in the structure shown and described.

Moreover, it is evident that, with certain modifications in details but in accordance with the same principles, similar machines may be designed to pump liquids and, more generally, to perform any kind of mechanical work.

It is a particular feature of the invention that the machines described may be coupled in stages. For example, where air or any kind of gas is to be brought to a very high pressure (100 kg. sq. cm. or more), which involves a 4-stage compression, it will be suitable to provide a pair of the multiple chamber compressors of the type just described, one of them taking care of two compression stages and the other of the two remaining stages. The designs and weights of these machines must be chosen so that they may have the same oscillating frequency. To this end the two casings must be coupled rigidly, while the wheels or inner elements are to be coupled through a gearing such as that shown in Fig. 5, adapted to compel the wheels to oscillate in synchronism in opposite directions to each other. Under such conditions the casings will remain motionless without it being necessary to anchor them relative to the ground.

Figure 5:
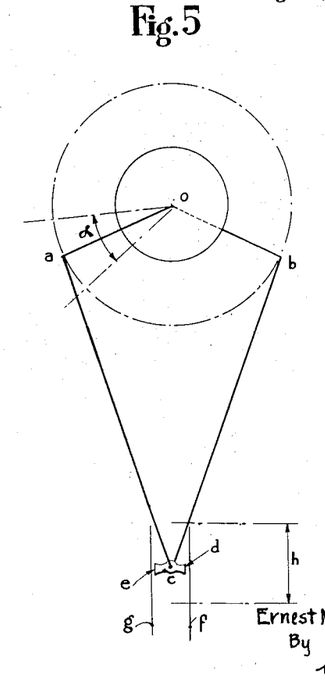
Fig. 5 is a diagrammatic view of means connecting a plurality of oscillating elements.

As diagrammatically shown in Fig. 5, the coupling gear may comprise two shafts arranged in line with each other on a common axis 0. Keyed on one shaft is the crank $oa$, connected to connecting rod $ac$. Keyed to the other shaft is the crank $ob$, preferably arranged in symmetric relation to crank $oa$ and connected to the rod $bc$. Both rods are pivotally connected to the same crosshead $c$ provided with two shoes $d$ and $e$ running respectively in guides $f$ and $g$. If the line of movement of the crosshead is in line with the axis 0 and the cranks $oa$ and $ob$ are symmetrically positioned with respect to this line and are of equal radius and the connecting rods are of equal length, when crank $oa$ describes an arc $a$ crank $ob$ will describe exactly the same arc but in the opposite direction of rotation on axis $0$. Meanwhile, the crosshead $c$ will travel through a distance $h$.

Figure 6:
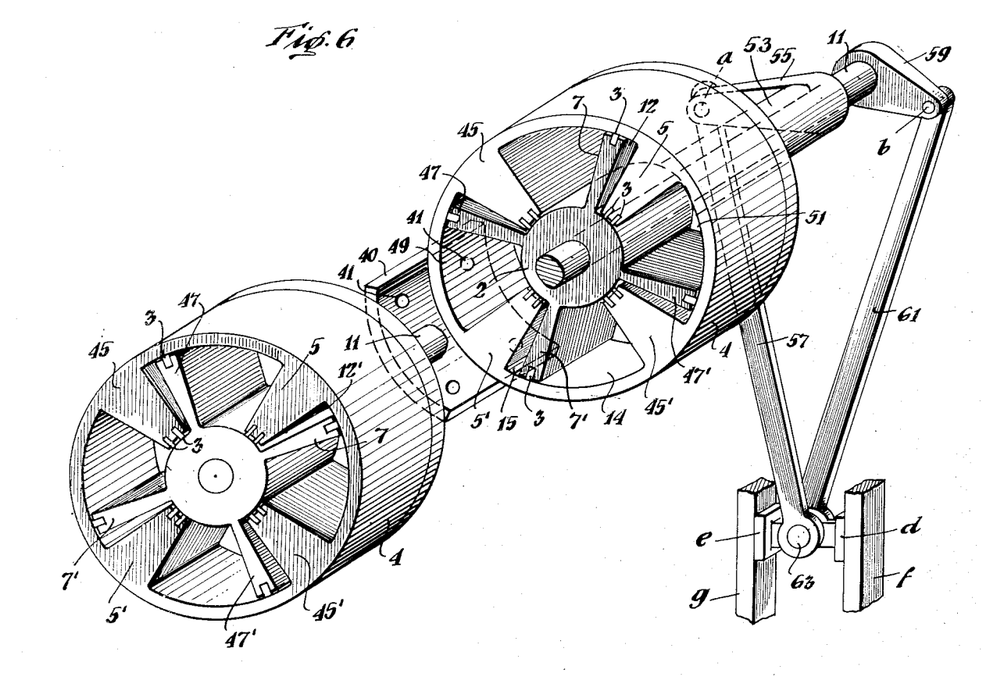

Fig. 6 shows a perspective view of a machine comprising a casing 4 in two sections which are rigidly connected together when the machine is fully assembled by a plate 40 fastened by suitable fasteners passing through the holes 41 and tapped into the casing 4. In Fig. 6 one section of the casing 4 is shown separated from the other with the shaft 11 broken. The construction of the two sections providing casings 4 and the partitions 5, 5' is similar to that of Fig. 1. In the struction of Fig. 6, however, intermediate between the partitions 5, 5' are additional partitions 45, 45' to provide in each section four chambers instead of two as shown in Fig. 1.

Within the respective chambers, as in the construction of Fig. 1, the vanes 7, 7' are carried on the cylindrical drum 2 so as to be reciprocatable therewith on the axis of shaft 11. Vanes 47, 47' also are carried by this drum 2 to reciprocate respectively in the chambers 49 and 51. It will be understood that the element comprising the drum 2 and the vanes 7, 7', 47, 47' constitutes an oscillatable element or wheel which will be reciprocatably moved upon the introduction under suitable control of a fluid pressure at the respective sides of the vanes 7, 7' and 47, 47'. It will be noted, however, that the vanes 7, 7', 47, 47' in the right hand section of the machine in Fig. 6 are on the opposite side of the respective partitions 5, 5', 45, 45' from those in the left hand section of the machine. Thus, upon a simultaneous introduction of the fluid under pressure between a vane, such as the vane 7, and the adjacent partition 5, these vanes in the two sections of the machine will be moved in opposite directions, the element of the right hand section moving in the counterclockwise direction and the element of the left hand part of the machine moving in the clockwise direction, as viewed in Fig. 6.

In order to provide for the oscillation of the two wheels or elements in synchronism in opposite directions to each other as mentioned above, the wheel or element of the right hand section of the machine is supported so as to be rotatable on and relative to the shaft 11. In Fig. 6, this element is provided with a hollow shaft 53 which is rigidly attached to the cylindrical drum 2 and is oscillatable therewith on the shaft 11. At the right hand end the hollow shaft 53 is provided with a lever arm 55 to which at its outer end is connected a connecting rod 57, corresponding to the diagrammatic connecting rod $ac$ of Fig. 5. The shaft 11 at its left hand end has fastened thereon the oscillatable element of the left hand section of the machine, this shaft extending to the right through the hollow shaft and carrying at its right hand end a lever arm 59 to which at its outer end is connected the connecting rod 61 corresponding to the diagrammatic connecting rod $bc$ of Fig. 5. As shown, the arms 55 and 59 are generally symmetrically positioned at opposite sides of a vertical plane through the axis of shaft 11. Both connecting rods are connected at $c$ to the crosshead 63 having shoes $e$ and $d$ running respectively in the crosshead guides $g$ and $f$ in a manner corresponding to these elements as shown in Fig. 5. It will be understood that the construction shown in Fig. 6 utilizing more than two vanes for each oscillatable element is adaptable, as is the construction of Figs. 3 and 4, to the use of the synchronizing mechanism which comprises the arms 55, 59 and the connecting rods 57, 61 and the crosshead 63, the angular movement of the oscillatable elements in such a construction being limited so that the arms 55 and 59 move through the angle $a$ generally corresponding to that diagrammatically shown in Fig. 5. The synchronizing mechanism, however, may be used with the construction of Fig. 1.

It will be understood further that, as the fluid pressure introduced into the spaces 12 and 15, for example, at one side respectively of the partitions 5, 5' of the right hand section, produces a reaction against these partitions and, correspondingly, the fluid pressure introduced into the spaces 12' and 15' of the left hand section of the machine also produces a reaction against the partitions 5, 5' of this section, and because these sections of the machine are rigidly fastened together by the plate 40, these reactions are transferred to the vanes themselves and no substantial force is applied to the casing 4 during movement of the oppositely oscillating elements which would produce rotation thereof.

The machines which have been described above may be fitted with all the arrangements and attachments used in other machines, particularly in the free-piston machines, such as cushions, accelerating members (according to the French Patent No. 873,751 dated March 6, 1941), as well as with fly-wheels having an adjustable inertia, etc. These machines also may be designed to operate at the rate of one power stroke per cycle, this cycle consisting of a forward and return stroke.

What we claim as our invention and desire to secure by Letters Patent is:

1. A fluid pressure machine comprising an element oscillatable on an axis and provided with a plurality of circumferentially spaced vanes extending outwardly of said element with respect to said axis, a casing enclosing and conforming to the exterior of said oscillatable element and said vanes while providing for oscillating movement of said element relative to said casing, said casing providing a plurality of circumferentially spaced chambers positioned outwardly of said element and each associated with a vane of said element reciprocatable therein as a piston upon oscillating movement of said element, means for conveying a fluid pressure medium at a substantial pressure to one of said chambers for acting on the vane therein to produce rotational movement of said element on said axis concomitantly with reduction in the pressure of said fluid pressure medium, means for conveying said fluid pressure medium of reduced pressure from said chamber to two chambers spaced circumferentially with respect to said first chamber to act on the vanes respectively in said two chambers to produce rotational movement of said element concomitantly with the rotational movement produced by said first vane, means for conveying a fluid pressure medium at relatively low pressure to two other chambers of said casing for action of the vanes in said two other chambers on said medium of low pressure to increase the pressure thereof upon rotational movement of said element, and means for conveying said medium of increased pressure from said two other chambers to a sixth chamber spaced circumferentially with respect to said two other chambers for action of the vane in said sixth chamber on said medium of increased pressure to further increase the pressure of said medium upon rotational movement of said element concomitantly with the rotation producing said first increase of pressure.

2. A fluid pressure machine as defined in claim 1 which comprises means for controlling the delivery and exhaust of the fluid pressure medium which initially is at a substantial pressure and the passage thereof between said chambers, and means for controlling the intake and discharge of said medium which initially is at low pressure and the passage thereof between said two other chambers and said sixth chamber.

3. A fluid pressure machine comprising a plurality of elements each supported to be separately oscillatable on a common axis and each provided with a plurality of circumferentially spaced vanes extending generally radially with respect to said axis, said vanes of the respective elements being in interspersed relation to the vanes of another of said elements, means cooperating with said elements to confine a fluid pressure medium between said vanes of said elements which are in the interspersed relation to each other to develope change in the pressure of said medium concomitantly with movement of said elements in opposite directions upon said axis, and means operatively connecting said elements together to provide for oscillating movement thereof symmetrically in synchronism in opposite directions upon said axis one with respect to the other.

4. A fluid pressure machine comprising a plurality of elements each supported to be separately oscillatable on a common axis and each provided with a plurality of circumferentially spaced vanes extending generally radially with respect to said axis, said vanes of the respective elements being in interspersed relation to the vanes of another of said elements, a casing enclosing and conforming to the exterior of said elements and said vanes and cooperating therewith to form a plurality of circumferentially spaced chambers within which respectively said vanes are reciprocatable in the oscillating movement of said elements, and means operatively connecting said elements to produce oscillating movement thereof symmetrically in synchronism in opposite directions one with respect to the other.

5. A fluid pressure machine comprising an element supported to be oscillatable on an axis and provided with a plurality of circumferentially spaced vanes extending generally radially with respect to said axis, a casing enclosing said element supported to be oscillatable on said axis of said element and provided with a plurality of partitions spaced circumferentially about said axis and extending generally radially with respect thereto, said casing and said element cooperating to form a plurality of circumferentially spaced chambers within which respectively said vanes and said partitions are reciprocatable relative to each other in the oscillating movement of said element and said casing relative to each other and so as to confine a fluid pressure medium between said vanes and said partitions for change in the pressure of said medium concomitantly with movement of said element and said casing in opposite directions upon said axis.

6. A fluid pressure machine comprising an element oscillatable on an axis and provided with a plurality of circumferentially spaced vanes extending outwardly of said element with respect to said axis, a casing enclosing and conforming to the exterior of said oscillatable element and said vanes while providing for oscillating movement of said element relative to said casing, said casing providing a plurality of circumferentially spaced chambers positioned outwardly of said element and each associated with a vane of said element reciprocatable therein as a piston upon oscillating movement of said element, means for confining a fluid pressure medium in a given chamber for change in the pressure thereof concomitantly with movement of the vane therein, and means for conveying said fluid pressure medium between said given chamber and two chambers spaced circumferentially with respect to said given chamber and connected to said chambers with respect to the vanes in said chambers so as to provide for change of the pressure of said fluid pressure medium in said two chambers in the same direction as the change in pressure of said fluid pressure medium in said given chamber concomitantly with the movement of the vanes in the respective chambers upon oscillating movement of said oscillatable element.

7. A fluid pressure machine comprising a plurality of members supported for oscillation thereof separately upon a common axis, vanes respectively carried by said members extending in each member generally radially with respect to said axis for reciprocating movement of said vanes oppositely with respect to each other upon opposite oscillating movement of the respective members, a casing cooperating with said vanes to provide fluid pressure chambers disposed about said axis within which respectively said vanes reciprocate circumferentially about said axis, means for confining a fluid under pressure within certain of said chambers to act on the respective vanes therein to effect said opposite reciprocating movements of said vanes and said members respectively supporting said vanes in opposite directions of oscillating movement upon said axis, and means for confining a compressible fluid within others of said chambers to be acted upon by the respective vanes therein in the opposite reciprocating movements thereof to compress said fluid therein.

8. A fluid pressure machine comprising a plurality of oscillatable members supported for oscillation thereof separately upon a common axis, prime mover elements respectively carried by said oscillatable members for reciprocating movement thereof oppositely with respect to each other concomitantly with opposite oscillating movement of said oscillatable members, means cooperating with said prime mover elements to provide a fluid pressure chamber and to confine a fluid under pressure within said chamber to act on said prime mover elements to move said elements and the oscillatable members respectively supporting said elements in opposite directions in the oscillating movement of said members upon said axis, compressor elements respectively carried by said oscillatable members for reciprocating movement thereof oppositely with respect to each other concomitantly with the oscillating movement of said oscillatable members, and means cooperating with said compressor elements to provide a fluid pressure chamber and to confine a fluid within said chamber to be acted on by said compressor elements as said compressor elements and the oscillatable members respectively supporting said elements are moved in opposite directions in the oscillating movement of said members upon said axis to effect compression of said fluid.

9. A fluid pressure machine comprising an element oscillatable on an axis and provided with a plurality of circumferentially spaced vanes extending outwardly of said element with respect to said axis, a casing enclosing and conforming to the exterior of said oscillatable element and said vanes while providing for oscillating movement of said element relative to said casing, said casing providing a plurality of circumferentially spaced partitions extending generally inwardly toward said axis and in interspersed relation between said vanes to provide a plurality of circumferentially spaced chambers each associated with a vane, said casing being supported so as to be oscillatable on said axis of said element, means for confining fluid under pressure to act on or to be acted upon by respective vanes of said element and inwardly projecting partitions of said casing concomitantly with reciprocating movement of said vanes and said partitions in opposite directions circumferentially about said axis and opposite oscillating movements of said element and said casing with respect to each other.

10. A fluid pressure machine comprising an element oscillatable on an axis and provided with a plurality of circumferentially spaced vanes extending generally radially outwardly of said element, a casing supported for oscillating movement thereof on said axis of said element and enclosing and conforming to the exterior of said oscillatable element and said vanes while providing for oscillating movement of said element relative to said casing, said casing providing a plurality of circumferentially spaced sections positioned outwardly of said element and each associated with and conforming to the meridian edge of a vane of said element, a plurality of circumferentially spaced sectors intermediate between and connecting said sections and providing generally radially extending circumferentially spaced walls conforming to the periphery of said element and disposed adjacent the limits of the relative reciprocating movements of said vanes and said walls upon oscillating movements of said element and said casing, said sections and said sectors cooperating with said element to provide within said casing a plurality of fluid pressure chambers between said sectors and forming with said vanes pressure volumes at either side of the respective vanes adapted to be increased and decreased upon relative reciprocating movement between said sections and said vanes concomitantly with relative oscillating movement between said element and said casing, and means cooperating with said sectors for confining fluid under pressure within said pressure volumes of said chambers to act on or to be acted upon by said vanes and said walls concomitantly with change in the pressure thereof as said element and said casing oscillate in opposite directions upon said axis.

11. A fluid pressure machine comprising an element oscillatable on an axis and provided with a plurality of circumferentially spaced vanes extending outwardly of said element with respect to said axis, a casing enclosing and conforming to the exterior of said oscillatable element and said vanes while providing for oscillating movement of said element relative to said casing, said casing providing a plurality of circumferentially spaced chambers disposed outwardly of said element and each associated with a vane of said element reciprocatable therein as a piston upon oscillating movement of said element, said chambers having walls respectively adjacent the limits of the reciprocating movement of the vanes in the respective chambers, said walls having openings therethrough communicating with the respective adjacent chambers for conveying a fluid pressure medium to and from each chamber at the respective sides of the vanes reciprocatable therein, a conduit connected to an opening of a selected wall which communicates with a given chamber for conveying through said opening and said conduit a fluid pressure medium under substantial pressure, a second conduit connecting an opening of said selected wall at the same side of said vane in said given chamber to an opening of a wall which communicates with another chamber circumferentially spaced with respect to said given chamber for conveying between said given chamber and said circumferentially spaced chamber said fluid pressure medium at a pressure less than said substantial pressure, and means respectively cooperating with said conduits for controlling the flow of the fluid conveyed thereby concomitantly with said oscillating movement of said element for effecting change in the pressure of said fluid pressure medium in stages in said given and said other chambers.

12. A fluid pressure machine as defined in claim 11 which comprises means cooperating with said first conduit for effecting delivery to said given chamber of a fluid pressure medium under substantial pressure to act on the vane in said given chamber to produce movement thereof in said given chamber and rotational movement of said element on its axis concomitantly with reduction of the pressure of said fluid pressure medium, and means cooperating with said second conduit for effecting delivery to said other chamber of said fluid pressure medium substantially at said reduced pressure to act on the vane in said other chamber to produce movement thereof in said other chamber and rotational movement of said element on its axis concomitantly with said movement of said element produced by said fluid pressure medium at said substantial pressure acting on said vane in said given chamber.

13. A fluid pressure machine as defined in claim 11 which comprises means cooperating with said first conduit for effecting delivery to said given chamber of a fluid pressure medium at a given pressure to be acted on by the vane in said given chamber to increase the pressure of said fluid pressure medium upon movement of said vane in said given chamber and rotational movement of said element on its axis, and means cooperating with said second conduit for effecting delivery to said other chamber of said fluid pressure medium substantially at said increased pressure to be acted upon by the vane in said other chamber further to increase the pressure of said fluid pressure medium upon movement of said vane in said other chamber and rotational movement of said element on its axis concomitantly with the movement of said element producing increase of pressure of said fluid pressure medium by the action thereon of said vane in said given chamber.

14. A fluid pressure machine comprising an element oscillatable on an axis and provided with a plurality of circumferentially spaced vanes extending outwardly of said element with respect to said axis, a casing enclosing and conforming to the exterior of said oscillatable element and said vanes while providing for oscillating movement of said element relative to said casing, said casing providing a plurality of circumferentially spaced chambers disposed outwardly of said element and each associated with a vane of said element reciprocatable therein as a piston upon oscillating movement of said element, means for confining in a given chamber at one side of the vane reciprocatable therein a fluid pressure medium under pressure capable of substantial reduction by expansion thereof for acting on the vane in said given chamber to effect movement thereof and rotational movement of said element concomitantly with reduction of the pressure in said fluid pressure medium, and means for conveying said fluid pressure medium of reduced pressure from said given chamber to another chamber spaced circumferentially with respect to said given chamber and for confining said fluid pressure medium in said other chamber to act concomitantly with further expansion thereof upon the vane reciprocatable in said other chamber at the side of said vane for producing movement of said vane in said other chamber and rotational movement of said element concomitantly with the rotational movement produced by said fluid pressure medium acting on said vane in said given chamber.

15. A fluid pressure machine as defined in claim 14 which comprises means for confining a compressible fluid pressure medium at a given pressure in a third chamber of said casing at the side of the vane reciprocatable in said third chamber at which said vane acts on said fluid pressure medium to increase the pressure thereof upon rotational movement of said element, and means for conveying said compressible fluid pressure medium at increased pressure from said third chamber to a fourth chamber spaced circumferentially from said third chamber and for confining said fluid pressure medium in said fourth chamber at a side of the vane reciprocatable therein at which said vane acts on said compressible fluid pressure medium further to increase the pressure thereof upon rotational movement of said element.

16. A fluid pressure machine as defined in claim 11 in which said means cooperating with said conduits for controlling the flow of fluid conveyed thereby comprises valve means associated with said conduits adjacent the respective openings to which said conduits are connected for controlling the fluid conveyed to and discharged from each chamber to effect in said chambers said change in the pressure of said fluid pressure medium, said valve means comprising a reciprocatable valve and rotatable shaft, means operatively connecting said rotatable shaft to said reciprocatable valve for effecting reciprocation of said valve upon rotation of said shaft, and means operatively connecting said rotatable shaft to said oscillatable member for effecting rotation of said shaft concomitantly with oscillating movement of said element.

17. A fluid pressure machine comprising a pair of elements each supported to be separately oscillatable on a common axis and each provided with a plurality of circumferentially spaced vanes extending generally radially with respect to said axis, a casing enclosing and conforming to the exterior of said oscillatable elements and to said vanes while providing for oscillating movement of said elements relative to said casing and relative to each other, said casing providing for each element a plurality of circumferentially spaced chambers within which respectively said vanes of said two elements reciprocate concomitantly with oscillating movement of the respective elements, and means operatively connecting said oscillatable elements together to provide for oscillating movements thereof one with respect to the other upon said axis symmetrically in synchronism in opposite directions.

18. A fluid pressure machine as defined in claim 17 in which said means operatively connecting said oscillatable elements comprises a crosshead supported for reciprocating movement thereof in a predetermined path, and connecting rods connecting said crosshead with the respective oscillating elements and diverging in the direction from said crosshead toward said elements.

19. A fluid pressure machine as defined in claim 17 in which said means operatively connecting said oscillatable elements together is adapted to produce equal and opposite movements of said oscillatable elements.

20. A fluid pressure machine comprising an element supported to be oscillatable on an axis and having an exterior surface of revolution with respect to said axis, said element being provided with a plurality of circumferentially spaced vanes extending outwardly of said element with respect to said axis, a casing enclosing and conforming to said exterior surface of said oscillatable element and to said vanes while providing for oscillating movement of said element relative to said casing, said casing providing a plurality of circumferentially spaced prime mover chambers and a plurality of circumferentially spaced compressor chambers disposed outwardly of said element and each associated with a vane of said element reciprocatable therein as a piston upon oscillating movement of said element, means for confining a fluid under substantial pressure in said prime mover chambers alternately at opposite sides of the vanes in said prime mover chambers for acting upon said vanes to effect reciprocating movement thereof and concomitant oscillating movement of said element, means for conducting said fluid from said prime mover chambers after acting on said vanes, means for confining in said compressor chambers alternately at opposite sides of the vanes in said compressor chambers a fluid to be compressed therein upon said reciprocating movement of said vanes in said compressor chambers concomitantly with said oscillating movement of said element, means for conducting said compressed fluid from said compressor chambers, and means associated with said confining and said conducting means for controlling the flow of said fluids to and from said prime mover and said compressor chambers concomitantly with the movement of the respective vanes in said chambers and said oscillating movement of said element.

21. A fluid pressure machine comprising a pair of elements each supported to be separately oscillatable on a common axis and each provided with a plurality of circumferentially spaced vanes extending generally radially with respect to said axis, a casing enclosing and conforming to the exterior of said oscillatable elements and to said vanes while providing for oscillating movement of said elements relative to said casing and relative to each other, said casing providing for each element a plurality of circumerentially spaced chambers within which respectively said vanes of said two elements reciprocate concomitantly with oscillating movement of the respective elements, said chambers associated with one of said elements being spaced along said common axis from the chambers associated with the other of said elements, and means operatively connecting said oscillatable elements together to provide for oscillating movement thereof one with respect to the other upon said axis in synchronism in opposite directions.

ERNEST MERCIER.
MARCEL EHLINGER.

(References on following page)

REFERENCES CITED

The following references are of record in the file of this patent:

UNITED STATES PATENTS

| Number | Name | Date |
|---|---|---|
| 128,426 | Rogers | June 25, 1872 |
| 360,353 | Lidback | Mar. 29, 1887 |
| 430,288 | Holmgren | June 17, 1890 |
| 435,506 | Longworth | Sept. 2, 1890 |
| 440,569 | Holmgren | Nov. 11, 1890 |
| 780,943 | Douglas | Jan. 24, 1905 |
| 1,024,098 | Price | Apr. 23, 1912 |
| 1,132,670 | Mulligan | Mar. 23, 1915 |
| 1,225,274 | Roberts | May 8, 1917 |
| 1,243,299 | Jackson | Oct. 16, 1917 |
| 1,488,580 | Wilson | Apr. 1, 1924 |
| 1,579,054 | Armuth | Mar. 30, 1926 |
| 2,257,884 | Mize | Oct. 7, 1941 |
| 2,279,740 | Matteson, Jr. | Apr. 14, 1942 |
| 2,319,911 | Aikman | May 25, 1943 |
| 2,413,636 | Long | Dec. 31, 1946 |
| 2,459,475 | Van Almelo | Jan. 18, 1949 |
| 2,493,355 | Mercier, et al. | Jan. 3, 1950 |

FOREIGN PATENTS

| Number | Country | Date |
|---|---|---|
| 402,818 | Great Britain | 1933 |
| 528,463 | France | Aug. 17, 1921 |
| 602,106 | Germany | 1934 |
| 610,813 | France | June 19, 1926 |
| 873,751 | France | Mar. 6, 1941 |